US012752621B2

(12) United States Patent
Vander Sluis et al.

(10) Patent No.: US 12,752,621 B2
(45) Date of Patent: Oct. 6, 2026

(54) TWISTED COILED ACTUATOR KINEMATIC SYSTEM FOR AUTOMOTIVE AERO DEVICES

(71) Applicant: Magna Exteriors Inc., Aurora (CA)

(72) Inventors: Daniel R. Vander Sluis, Rochester Hills, MI (US); Braendon R. Lindberg, Metamora, MI (US); Jeffrey Caraway, Oxford, MI (US); Mark A Richardson, Ortonville, MI (US)

(73) Assignee: Magna Exteriors Inc., Aurora (CA)

( * ) Notice: Subject to any disclaimer, the term of this patent is extended or adjusted under 35 U.S.C. 154(b) by 264 days.

(21) Appl. No.: 18/628,259

(22) Filed: Apr. 5, 2024

(65) Prior Publication Data

US 2024/0336129 A1 Oct. 10, 2024

Related U.S. Application Data

(60) Provisional application No. 63/494,833, filed on Apr. 7, 2023.

(51) Int. Cl.
*B60K 11/08* (2006.01)

(52) U.S. Cl.
CPC .................................. *B60K 11/085* (2013.01)

(58) Field of Classification Search
CPC ........ B60K 11/08; B60K 11/085; B62D 35/00
See application file for complete search history.

(56) References Cited

U.S. PATENT DOCUMENTS 4,490,975 A * 1/1985 Yaeger ............... H01H 61/0107 337/140
4,497,241 A * 2/1985 Ohkata ............... F24F 13/1426 454/258
4,753,288 A * 6/1988 Harvey ..................... F01P 7/10 123/41.58
5,956,015 A 9/1999 Hino
6,446,876 B1 * 9/2002 Stefano .............. B60H 1/00857 454/258
6,979,050 B2 * 12/2005 Browne ................. B62D 35/00 296/180.1
6,991,280 B2 * 1/2006 McKnight ................. F15D 1/10 296/180.1
7,118,652 B2 * 10/2006 Mc Knight ............ B62D 35/00 296/180.1

(Continued)

FOREIGN PATENT DOCUMENTS

JP 59059521 A * 4/1984
JP 2015044560 A * 3/2015 ........... B60K 11/085

(Continued)

OTHER PUBLICATIONS

Artificial Muscles from Fishing Line and Sewing Thread, Carter S. Haines et al., Science. vol. 343, pp. 868-872, dated Feb. 21, 2014, downloaded from www.sciencemag.org on Nov. 20, 2014 (6-pages).

*Primary Examiner* — Laura Freedman

(57) ABSTRACT

An active air module for a vehicle. The module includes an active air feature having at least an open and closed position. Air is allowed to enter when in the open position and airflow is at least partially blocked in the closed position. A soft actuator such as a twisted coiled polymer actuator apparatus is used for actuation of the active air feature from the closed position to the open position.

13 Claims, 6 Drawing Sheets

(56) References Cited

U.S. PATENT DOCUMENTS

| | | | | |
|---|---|---|---|---|
| 7,204,472 | B2 * | 4/2007 | Jones | F16K 15/033 251/129.06 |
| 7,498,926 | B2 * | 3/2009 | Browne | B60K 11/085 123/41.58 |
| 7,517,279 | B2 * | 4/2009 | Kober | B60H 1/00295 454/155 |
| 7,597,616 | B2 * | 10/2009 | Browne | B60H 1/3421 454/143 |
| 7,607,717 | B2 * | 10/2009 | Browne | B62D 35/00 296/180.1 |
| 7,686,382 | B2 * | 3/2010 | Rober | B62D 35/005 296/180.1 |
| 7,775,582 | B2 * | 8/2010 | Browne | B62D 35/005 296/180.1 |
| 7,866,737 | B2 * | 1/2011 | Browne | F24F 13/1426 49/82.1 |
| 8,561,738 | B2 * | 10/2013 | Charnesky | B60K 11/085 180/68.1 |
| 8,708,787 | B2 * | 4/2014 | Alexander | F16K 31/004 454/162 |
| 8,821,224 | B2 * | 9/2014 | Alexander | B60H 1/249 454/162 |
| 8,941,291 | B2 * | 1/2015 | Kim | H05H 1/2406 123/536 |
| 9,021,801 | B2 * | 5/2015 | Gao | F03G 7/06143 60/528 |
| 9,120,373 | B2 * | 9/2015 | Yoo | B60K 11/085 |
| 9,676,269 | B2 * | 6/2017 | Jeong | B60K 11/085 |
| 9,937,966 | B1 * | 4/2018 | Yoon | F03G 7/0614 |
| 10,017,048 | B2 * | 7/2018 | Manhire | B60R 19/52 |
| 10,480,492 | B2 * | 11/2019 | Kaneko | F03G 7/062 |
| 10,525,819 | B2 * | 1/2020 | Lindberg | F24F 13/15 |
| 10,577,076 | B1 * | 3/2020 | Wylonis | B64C 3/185 |
| 11,143,150 | B2 * | 10/2021 | Zhao | B60K 11/085 |
| 11,181,100 | B2 * | 11/2021 | Kaneko | D03D 1/00 |
| 11,199,132 | B2 * | 12/2021 | Diaz | F02C 7/04 |
| 11,458,808 | B2 * | 10/2022 | Kim | F24F 13/12 |
| 11,952,683 | B2 * | 4/2024 | Kaneko | F03G 7/0612 |
| 12,479,520 | B2 * | 11/2025 | Howard | B62D 35/007 |
| 2013/0223980 | A1 * | 8/2013 | Pastrick | F01D 5/00 415/1 |
| 2014/0199930 | A1 * | 7/2014 | Toda | B60K 11/085 454/75 |
| 2021/0071460 | A1 * | 3/2021 | Arab | F24F 13/15 |
| 2022/0026006 | A1 | 1/2022 | Malewicz et al. | |

FOREIGN PATENT DOCUMENTS

| | | | | | |
|---|---|---|---|---|---|
| KR | 20100046963 | A | * | 5/2010 | B60K 11/085 |
| KR | 20110107706 | A | * | 10/2011 | B62D 25/08 |
| KR | 101655700 | B1 | * | 9/2016 | B60R 13/06 |
| WO | 2019106944 | A1 | | 6/2019 | |

* cited by examiner

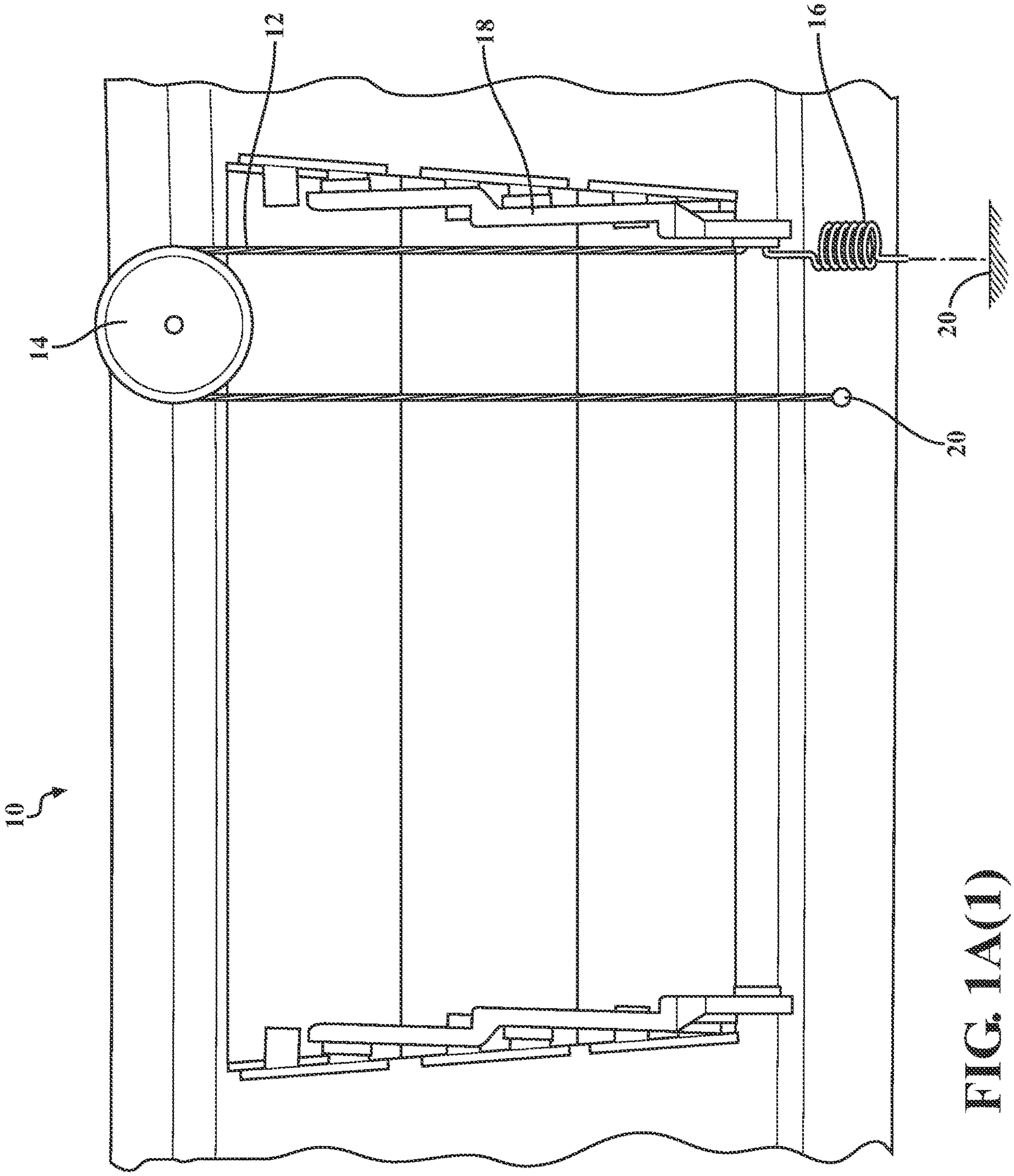
FIG. 1A(1)

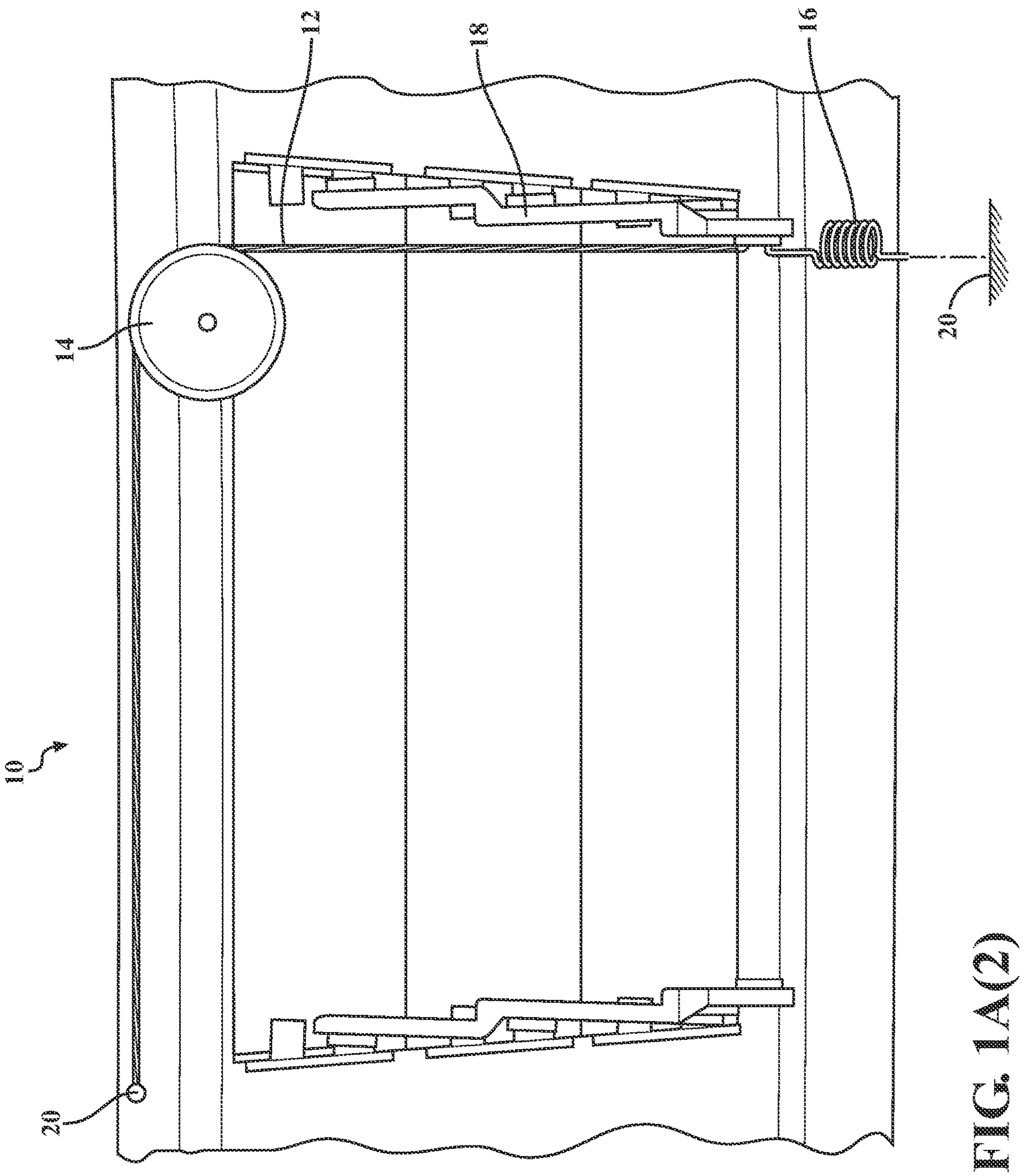
FIG. 1A(2)

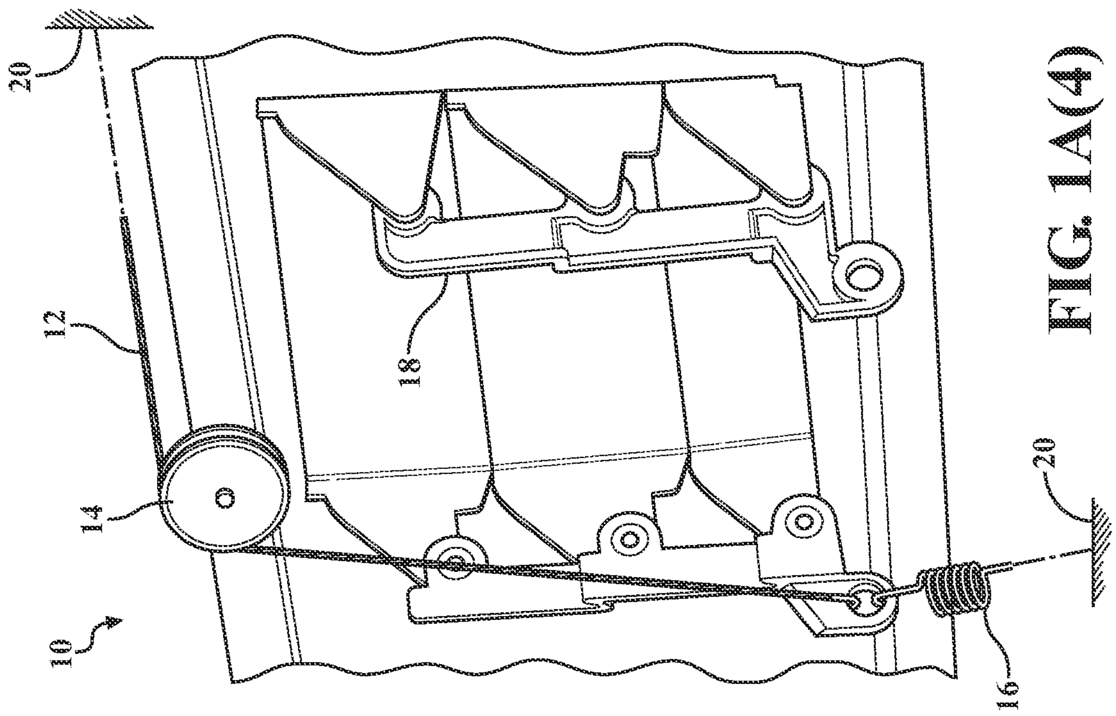
FIG. 1A(4)
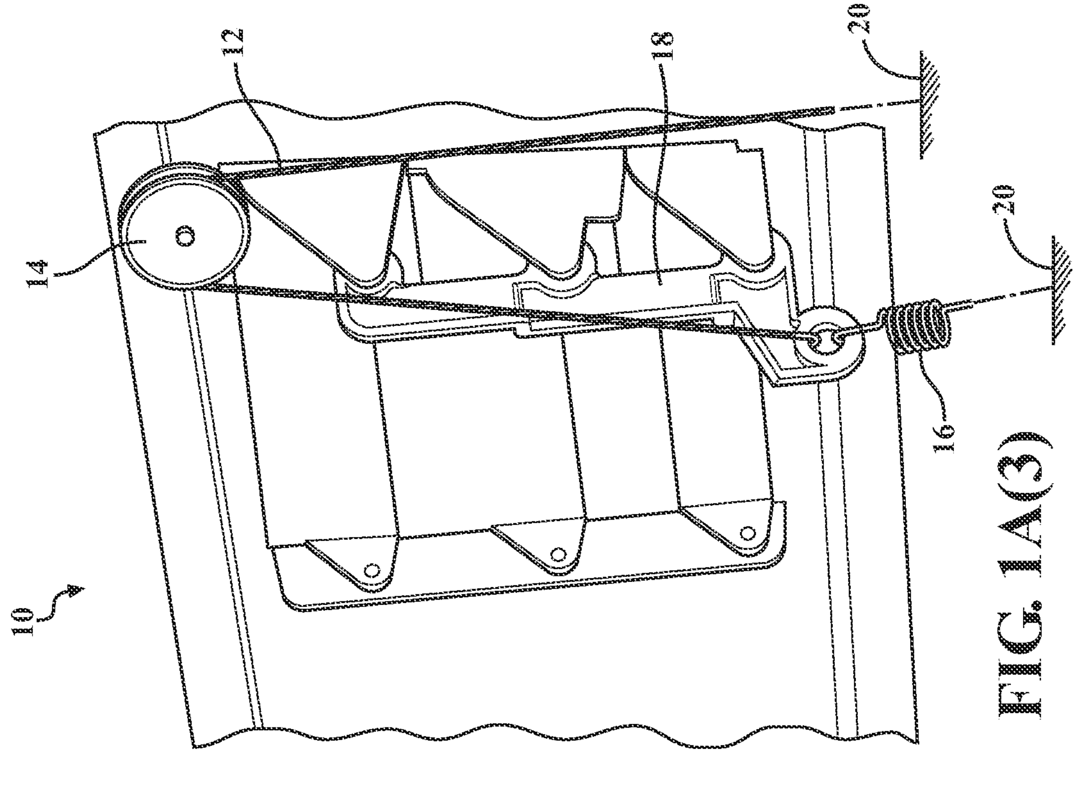
FIG. 1A(3)

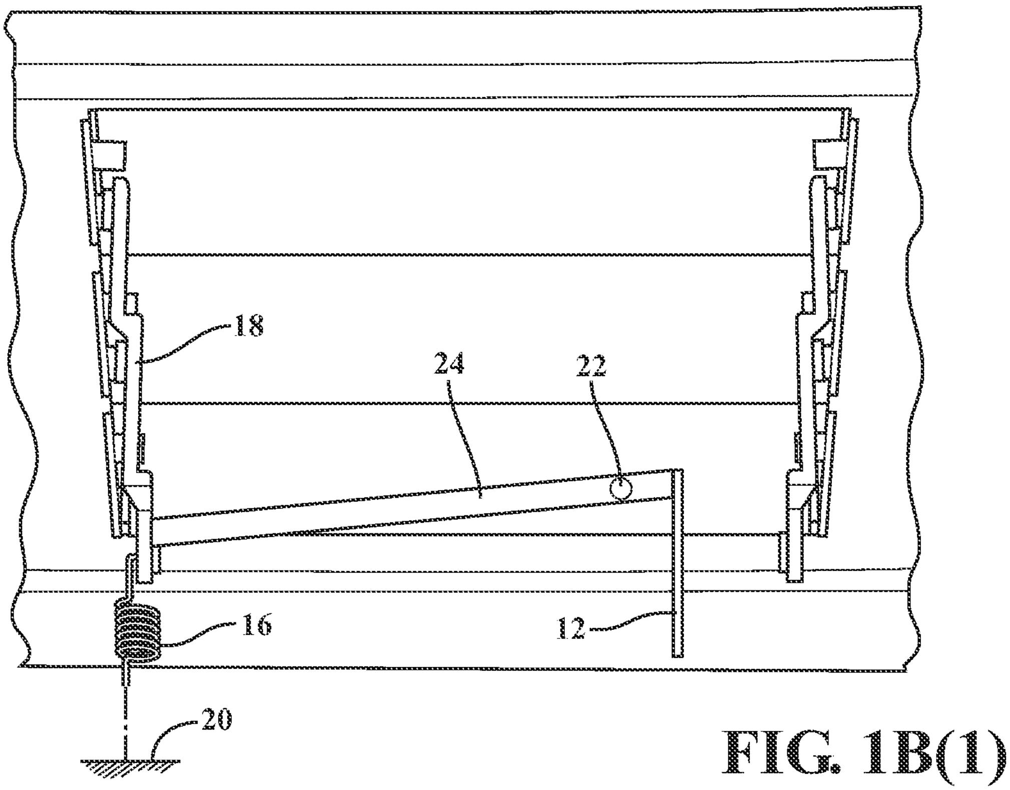
FIG. 1B(1)
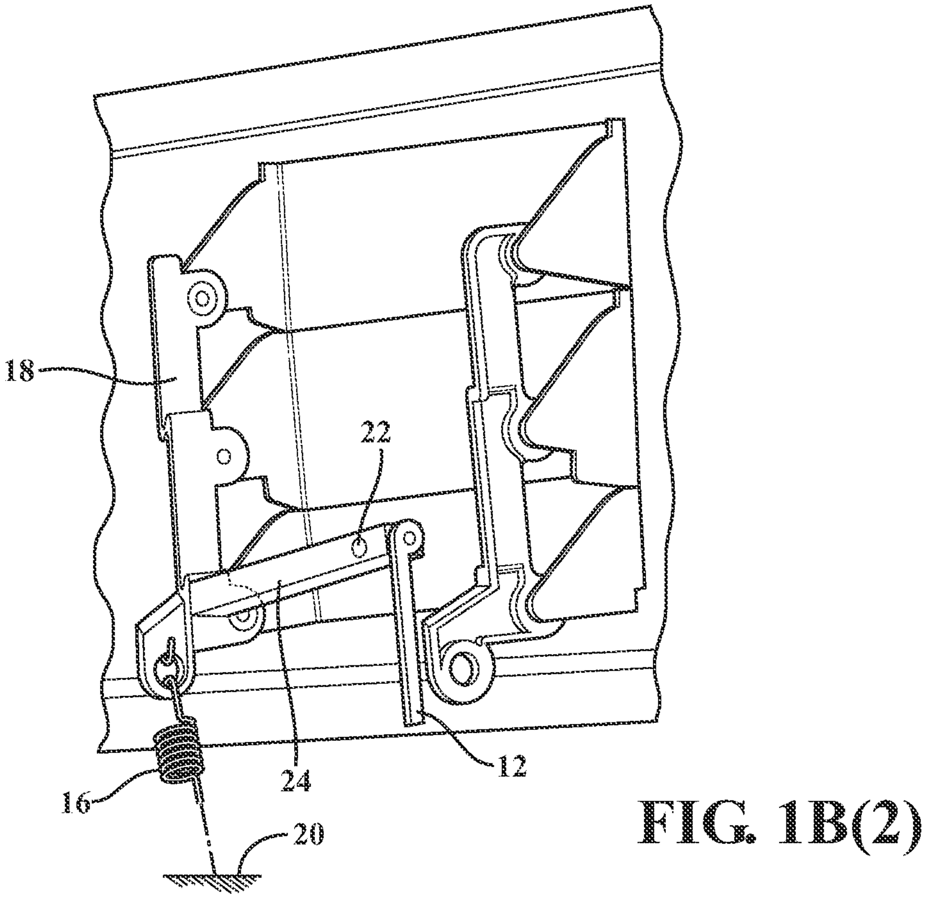
FIG. 1B(2)

TWISTED COILED ACTUATOR KINEMATIC SYSTEM FOR AUTOMOTIVE AERO DEVICES

CROSS-REFERENCE TO RELATED APPLICATIONS

This application is a Non-Provisional Patent Application and claims benefit of U.S. Provisional Patent Application No. 63/494,833, filed Apr. 7, 2023. The disclosure of the above application is incorporated herein by reference.

FIELD OF THE INVENTION

The present invention relates to a twisted coiled actuator kinematic system for automotive aero devices.

BACKGROUND OF THE INVENTION

There are multiple patents for the invention of twisted coiled polymers (TCP) however nothing was found regarding specific active aero application use as outlined below. As examples twisted coiled polymer, polymer actuator, twisted coiled polymer actuator are found in WO2019106944A1, US2022026006A1 and other like patents.

Current automotive-grade actuator units for active aero modules are high-cost DC electric motor units focused on rotary drive function. These units are robust and very useful. However, the actuator motors used are heavy require control units and are expensive to integrate into an active grill system (AGS) or other active aero components. Therefore, it is a goal to provide a lightweight functional substitute for rotary drive active grill systems or other active aero devices used on vehicles.

SUMMARY OF THE INVENTION

In the present invention there is provided a soft actuator such as twisted coiled polymer as part of a low-cost actuator system to power the movement of an active aero module (linear, rotation, or combination) in place of an DC electric actuator. An active air module for a vehicle is provided. The active air module includes an active air feature having at least an open and closed position wherein air is allowed to enter when in the open position and airflow is at least partially blocked in the closed position. A TCP actuator apparatus for actuation of the active air feature from the closed position to the open position.

Our patent concept includes twisted coiled polymer (TCP) units which are arranged in a kinematic mechanism system that allows the TCP to act as a load generation unit for pre-loading a spring to engage in a trigger-latch mechanism also utilizing a TCP to release the trigger-latch element for each cycle of the overall system. Each cycle of our concept TCA (twisted coil actuator) kinematic mechanism outputs a linear force-load or torque capable of being used to actuate an active aero module with moving parts, such as AGS vanes. Additional patent concepts include twisted coiled polymer (TCP) units which are arranged in a pulley system with a spring pre-loading the TCP in which the TCP pulls in a linear motion to actuate an active aero module vanes. Lastly a patent concept of a TCP pulling a simple lever in a linear motion to where the TCP is the driver of the motion to actuate an active aero module vanes.

Therefore, the present invention provides for use of a "twisted coiled polymer" (TCP) as part of a kinematic mechanism to actuate active aero systems.

The present invention advantageously provides a low-cost actuator utilizing TCP enabled elements and also a trigger system which is designed to be suitable for use with the TCP actuators.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1A (1) and 1A (3) are perspective views showing a first embodiment of an active air module for a vehicle in accordance with the present invention;

FIGS. 1A (2) and 1A (4) are perspective views of a second embodiment of an active air module for a vehicle in accordance with the present invention;

FIGS. 1B (1) and 1B (2) show a third embodiment of an active air module for a vehicle in accordance with the present invention;

DETAILED DESCRIPTION OF THE PREFERRED EMBODIMENTS

Figure 2:
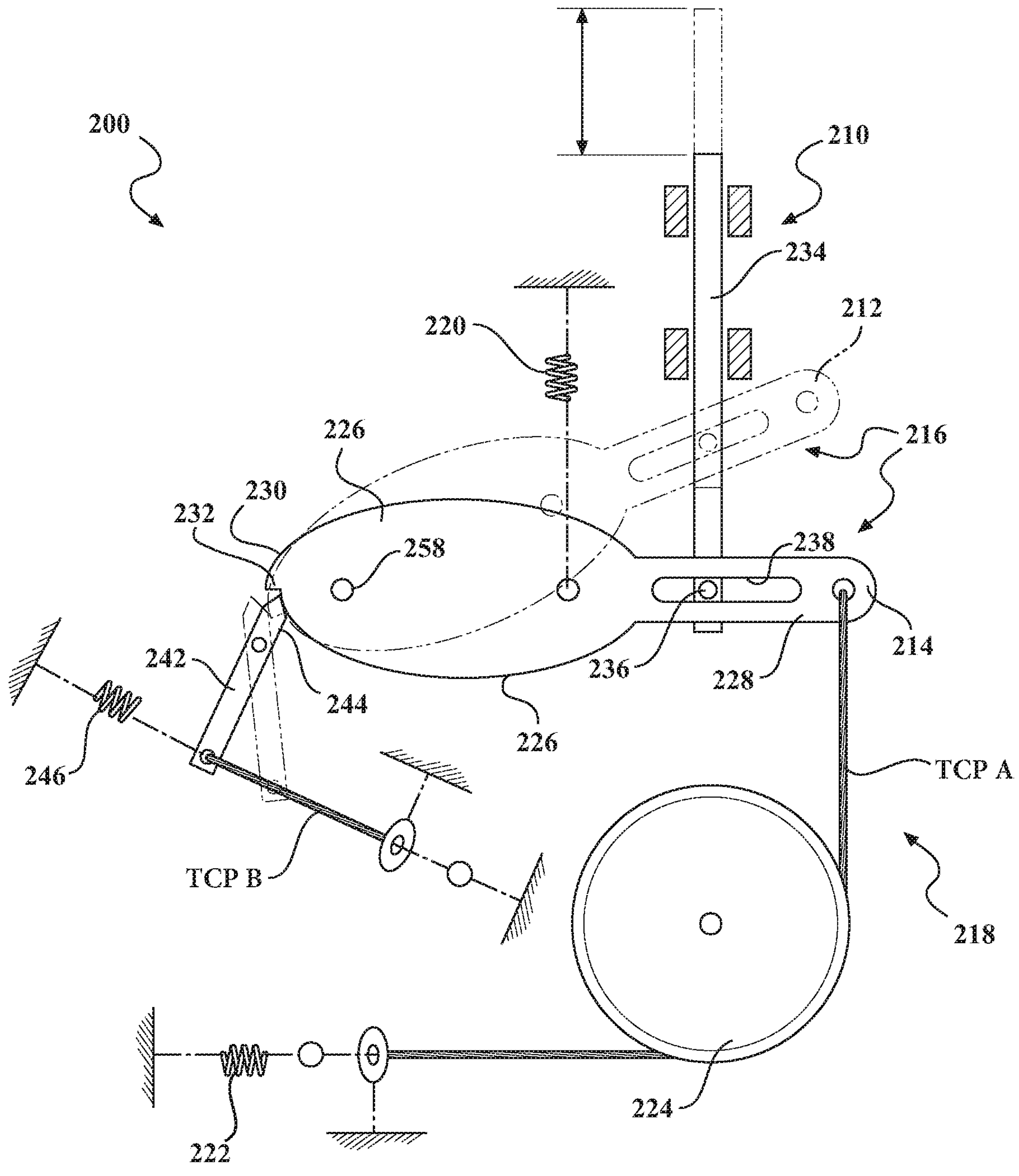
FIG. 2 is a schematic view of a fourth embodiment of an active air module for a vehicle in accordance with the present invention.

The following description of the preferred embodiment(s) is merely exemplary in nature and is in no way intended to limit the invention, its application, or uses.

The present invention includes using a soft actuator preferably twisted coiled polymer (TCP) units which are arranged in a kinematic mechanism system that allows the TCP to act as a load generation unit for pre-loading a spring to engage in a trigger-latch mechanism also utilizing a TCP to release the trigger-latch element for each cycle of the overall system. Each cycle of our concept TCP actuator kinematic mechanism outputs a linear force-load or torque capable of being used to actuate an active aero module with moving parts, such as AGS louvers or vanes. Additional patent concepts include twisted coiled polymer (TCP) units which are arranged in a pulley system with a spring preloading the TCP in which the TCP pulls in a linear motion to actuate an active aero module vane. Lastly a patent concept of a TCP pulling a simple lever in a linear motion to where the TCP is the driver of the motion to actuate an active aero module vane.

Soft actuators useful in a preferred embodiment include TCP actuators. However other actuators which may be utilized as a linear type of actuator may be utilized. Typically, soft actuators useful in the present invention exhibit shape changes when exposed to heat, light and/or electromagnetics. Examples of such actuators include shape changing actuators such as electro-active polymers, di-electric elastomers, shape memory alloys, liquid crystal elastomer, twisted coil polymers and mixtures thereof.

Referring now to the figures specifically FIGS. 1A (1)-1A (4) an active air module for a vehicle generally shown at 10 shows use of TCP actuator 12 along pulley wheel 14 to open the louver system 18. Tensioner 16 keeps tension to try and keep the system in a closed status. The TCP actuator overcomes the force of the tensioner to open. Fixation 20 is the location of the attachments.

Referring now to the figures specifically FIGS. 1B (1)-1B (2) the active air module for a vehicle shows use of TCP actuator 12 pulling lever 24 which rotates around pivot point 22. The TCP actuator overcomes the force, and the lever shape allows for more travel to open with less travel on the TCP actuator. Fixation 20 is the location of the attachments. In the drawings of FIGS. 1A and 1B please note that the reference numerals indicate the following elements:

12. TCP actuator
14. Pulley wheel
16. Tensioner
18. Louver system
20. Fixation
22. Pivot point
24. Lever Referring now to FIG. 2, there is provided an active air module for a vehicle generally shown at 200. The active air module 200 includes an active air feature generally indicated at 210 having at least an open 212 and closed 214 positions wherein airflow 216 is allowed to enter when in the open position 212 and airflow 216 is at least partially blocked in the closed position 214.

A TCP actuator (A), hereafter "TCP A" apparatus generally shown at 218 is provided for actuation of the active air feature 210 from the closed position 214 to the open position 212.

The TCP A 218 includes a tensioning spring 220 for biasing the active air feature towards a closed or open position and TCP A is used to overcome the tensioning spring 220. Spring 222 is provided at the anchor point of the TCP A to provide tensioning such that the TCP A is tensioned but buffered from forces which might harm the TCP A strand. The TCP A is used to overcome the biasing in the opposite direction as the spring bias provided by spring 220. As shown in this embodiment a pulley wheel 224 is used for directing the TCP A and allowing a compact package which provides a long enough length of TCP to actuate the TCP apparatus. A pivotal actuator arm 226 including a lever end 228 and a cam end 230, the cam end 230 includes a catch 232 for holding the actuator arm 226 in the open or closed position. The lever end 228 is attached to a movable air closure device 234 by way of a pin 236 which rides in an elongated slot 238 and biased in a first open or closed direction. The closure device can be a direct sliding door, or a load transfer link attached to another opening and closing structure such as a louver assembly in an AGS (active grill) system. The pivotal actuator arm 226 is pivoted at the pivot point 258 about which the lever arm 228 moves up and down for opening or closing of the device.

A trigger set assembly 242 is provided which includes a second TCP actuator member TCP B which engages a sear pawl 244 for holding of the active air feature in a set position (which is closed in FIG. 2). The sear pawl 244 is biased by spring 246 for engaging the cam end 230 at catch 232. This allows for retaining the active air feature in the open position and "cocked" for returning to the closed position upon triggering the sear pawl. In operation TCP A cocks the assembly to the closed position. When it is necessary to open the assembly tension, TCP A is let off and TCP B is contracted to release the sear pawl 244 which allows spring 220 to contract and open the air feature by moving load transfer link 234.

Figure 3:
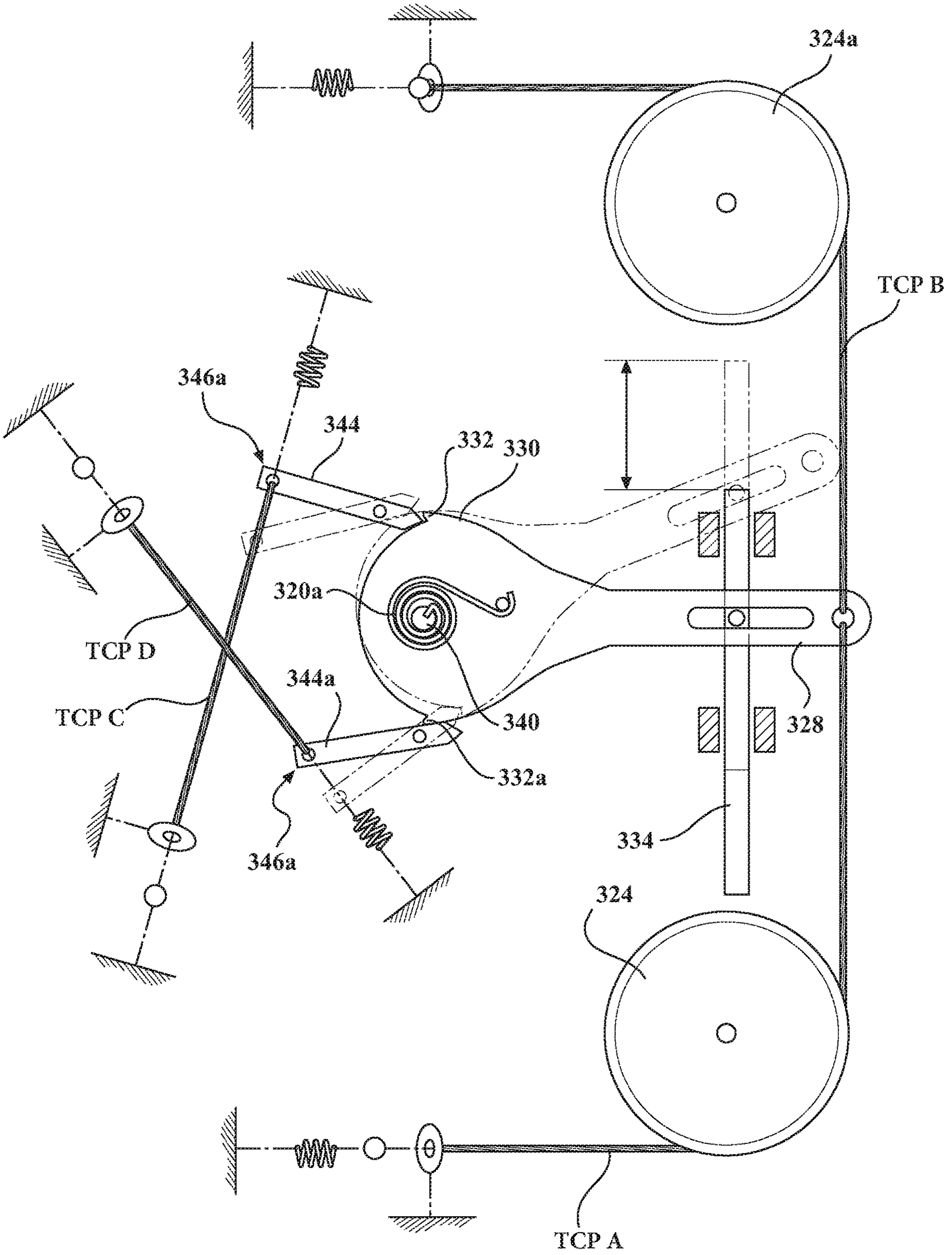
FIG. 3 is a schematic view of a fifth embodiment of an active air module for a vehicle in accordance with the present invention.

In another embodiment shown in FIG. 3 (where numbers differing by 100 from FIG. 2 show like elements therein) is provided. In this embodiment a pair of TCP actuators TCP A and TCP B are used for providing controlled opening and closing using the load transfer lever 334. Two trigger arrangements 344 and 344*a* provide locking points with the catches 332 and 332*a*. In this embodiment a normally centered clock spring 320*a* is provided around the pivot point 340 and will provide bidirectional biasing such that the apparatus can be cocked in either the open or closed positions. The trigger pawls are actuated by TCP C and TCP D actuators. As will be readily appreciated by those skilled in the art, a suitable controller (not shown) is used for providing the proper sequencing of the various TCP actuators in order to achieve desired opening and closing of the active air feature. As will be readily appreciated, while it is preferred to use a twisted pair TCP actuator, a single strand is also within the scope of the present invention.

Twisted and coiled polymer actuators are a form of soft actuator that are composed of nylon sewing thread or fishing line and use joule heating to contract or expand in length. The strands of polymer are twisted under load to produce a spring-like structure. Joule heating is the process of converting electrical energy to thermal energy through power dissipation by a resistor. For TCP actuators, voltage is applied (approximately 10V) to the coils and the current drawn heats the structure. Nylon thread has a negative thermal expansion in the axial direction, which provides a way to have reversible contractions by heating. Thus, a suitable electronic controller which can be an engine or vehicle control system can send the appropriate currents to the TCP actuators for contracting and expanding the TCP actuators and thereby controlling opening or closing of the active grill system or other active aero system.

Therefore, the present invention provides for use of a "twisted coiled polymer" (TCP) as part of a kinematic mechanism to actuate active aero systems.

The present invention advantageously provides a low-cost actuator utilizing TCP enabled elements and also a trigger system which is designed to be suitable for use with the with a TCP actuators.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An active air module for a vehicle, comprising:

an active air feature having at least an open position and a closed position wherein airflow through the active air feature is allowed when in the open position and airflow is at least partially blocked in the closed position; and a shape changing actuator apparatus for actuation of the active air feature from the closed position to the open position, wherein the shape changing actuator apparatus has a pivoted actuator including a lever and a cam, the cam includes a first catch for holding the lever in an open or closed position, the lever is attached to the active air feature and biased by a spring in a first-direction, a first shape changing actuator is attached to the lever for moving the lever in a second direction against the spring for cocking the lever, wherein a first pawl engages the first catch in the cam for holding of the lever in the open position, a second shape changing actuator is attached to the first pawl for selectively triggering the lever for moving of the active air feature to the closed position when releasing the first pawl, and wherein the cam includes a second catch, and a second pawl is provided for engaging the second catch, and a third shape changing actuator is provided for actuation of the second pawl for holding the cam in the closed position.

2. The active air module of claim 1 wherein each of said first shape changing actuator, second shape changing actuator and third shape changing actuator is a twisted coil polymer (TCP) actuator.

3. The active air module of claim 1 wherein the actuator apparatus includes a tensioning spring that acts on the first shape changing actuator.

4. The active air module of claim 1 wherein a fourth shape changing actuator is provided for providing movement to the lever in an opposite direction of the first shape changing actuator.

5. The active air module of claim 1 wherein the spring is a clock spring.

6. The active air module of claim 1 wherein said first shape changing actuator is routed over a pulley.

7. The active air module of claim 1 wherein each of the shape changing actuators is a soft actuator.

8. The active air module of claim 1 wherein each of the shape changing actuators is an electro-active polymer, dielectric elastomer, shape memory alloy, liquid crystal elastomer, or twisted coil polymer.

9. An active air module for a vehicle comprising:

an active air feature having at least an open position and a closed position wherein air is allowed to enter when in the open position and airflow is at least partially blocked in the closed position; and a twisted coil polymer (TCP) actuator apparatus for actuation of the active air feature from the closed position to the open position, wherein the actuator apparatus has a pivotal actuator including a lever and a cam, the cam includes a first catch for holding the lever in an open or closed position, the lever is attached to the active air feature and biased by a spring in a first-direction, a first TCP actuator is attached to the lever for moving the lever in a second direction against the spring for cocking the lever, wherein a first pawl engages the first catch in the cam for holding of the lever in the open position, a second TCP actuator is attached to the first pawl for selectively triggering the lever for moving of the active air feature to the closed position when releasing the first pawl, and wherein the cam includes a second catch, and a second pawl is provided for engaging the second catch, and a third TCP actuator is provided for actuation of the second trigger pawl for holding the cam in the closed position.

10. The active air module of claim 9 wherein the actuator apparatus includes a tensioning spring that acts on the first TCP actuator.

11. The active air module of claim 9 wherein a fourth TCP actuator is provided for providing movement to the lever in an opposite direction of the first TCP actuator.

12. The active air module of claim 11 wherein the spring is a clock spring.

13. The active air module of claim 9 wherein said first TCP actuator is in line with and routed over a pulley.

* * * * *